United States Patent [19]

Thompson

[11] 4,023,531

[45] May 17, 1977

[54] ANIMAL WASTE DISPOSAL APPARATUS

[75] Inventor: John W. Thompson, Timonium, Md.

[73] Assignee: Wahmann Mfg. Co., Timonium, Md.

[22] Filed: Sept. 2, 1975

[21] Appl. No.: 609,806

[52] U.S. Cl. .................................. 119/22; 119/17
[51] Int. Cl.² ........................................ A01K 1/01
[58] Field of Search ................. 119/22, 27, 28, 17, 119/18, 19, 21, 1, 24; 198/198, 202, 229, 188; 248/95, 99, 101; 141/166; 214/83.26

[56] References Cited

UNITED STATES PATENTS

| | | | |
|---|---|---|---|
| 2,565,521 | 8/1951 | Ratermann | 119/22 |
| 2,868,245 | 1/1959 | Ernst | 198/188 |
| 3,319,606 | 5/1967 | Virgil | 119/22 |
| 3,429,297 | 2/1969 | Schroer | 119/17 |
| 3,642,119 | 2/1972 | Warwick | 198/202 |
| 3,704,688 | 12/1972 | Wilson | 119/22 |
| 3,776,190 | 12/1973 | Hurlbert | 119/18 |

Primary Examiner—Russell R. Kinsey
Assistant Examiner—Peter K. Skiff

Attorney, Agent, or Firm—Cushman, Darby & Cushman

[57] ABSTRACT

An animal caging system and an automatic waste disposal system used in conjunction therewith including a continuous belt mounted below a row of animal cages for receiving waste from the cages, a motor for continuously driving the belt about a pair of rollers which maintain the belt taut, and a scraper engaging the outer belt surface adjacent to a chute which guides the waste into a disposable flexible bag held in place by a spring loaded rectangular member disposed about the chute outlet or spout. The belt is mounted in a frame which extends beneath the row of cages on rails of the cage frame which supports the individual cages in one or more rows. The entire waste disposal unit can be removed for sterilization by sliding along the rails. Each cage preferably includes a feeder with a plate deflecting crumbs onto the belt and further plates around the cage bottom for ensuring that all waste is deflected onto the belt.

23 Claims, 11 Drawing Figures

ANIMAL WASTE DISPOSAL APPARATUS

BRIEF DESCRIPTION OF THE PRIOR ART AND SUMMARY OF THE INVENTION

The invention relates to an animal caging system, and particularly to an automatic waste disposal system used in conjunction therewith.

Modern medical practice, including research, requires large numbers of small animals such as mice, rats, rabbits, monkeys, etc. for experimental purposes. The animals must be maintained in laboratories or the like ready for such experiments and while the experiments are continuing. In order that the results will be accurate, and that the animals will be available free from disease when needed, it is necessary that they be kept in comfortable sanitary conditions. In addition to these practical consideration, it is one of the principles of laboratory animal care that they be housed in sanitary conditions, properly feed, and kindly treated.

Laboratory animals are usually housed in cages which are mounted in rows, commonly one above the other, on a frame. Often a watering system provides a supply of water to the respective cages. Usually a feeder is provided for each cage. Each of the animals obviously produces at least a small quantity of waste which because of the concentration of animals must be removed from the environment of the case and disposed of to maintain the cages and the animals therein under the required sanitary conditions.

One way in which this has been accomplished in the past is by providing a continuous tray or the like which extends below the bottom of the cages in each of the various rows. Water is periodically flushed along the tray and eventually to a sewer. This technique however has a number of problems. The water useage is high and water is becoming increasingly expensive and in short supply. Flushing directly into the sewer can create an overload. In addition the water will not in every instance remove all of the waste resulting in some residual odor. Complete washing and sterilization of this system requires a disassembly of the cages and washing and sterilization of the individual water confining trays.

Other systems in the prior art have utilized a moving belt disposed below a row of cages to remove waste from the cages and convey it to some convenient container. In the patent to Lockwood U.S. Pat. No. 1,709,136 the waste from the baby chickens is deposited in a drawer. In the patent to Patchett U.S. Pat. No. 3,109,413 a moving belt collects eggs from chickens.

The present invention relates to an automatic waste disposal system and a caging system of which the waste disposal system forms part thereof whereby a continuous belt is mounted below a number of animal cages supported by rails on a frame for simple and easy removal. The belt is continuously driven by an electrical motor removably mounted on a horizontal plate at one end of the waste disposal system and driving one of a pair of rollers which engage the belt and maintain it in a substantially taut condition. The roller is mounted within a frame which similarly engages a pair of rails on the cage frame for sliding movement therewith along a direction transverse to the direction of sliding movement of the cages. The entire waste disposal system can thus be easily and simply removed from the cage frame and cages for periodic sterilization thereof without the need for disassemblying the entire structure.

A scraper is mounted at one end of the belt adjacent to the roller and engaging the outer surface of the belt on the underside thereof. The scraper ensures that the waste material which has been deposited on the outer surface of the belt is deflected into a chute. A flexible bag is held in place about the outlet or spout of the chute for receiving the waste material. When the bag has been filled, it can be simply replaced, thus removing the waste produced by the animals simply and easily from the environment of the cages.

The flexible bag is held in place by a rectangular member which is disposed about the outlet of the gutter and urged upward into an engaging position by a spring bearing upon a rod attached to the rectangular member. For removing a flexible plastic bag or adding a new bag, the rectangular member can simply be pulled downward against the force of the spring and the bag pushed through the opening and over the top thereof. As the rectangular member returns to its initial position, the bag is held between the member and gutter spout.

The animal cages are provided with inclined plates which ensure that all of the waste produced within the cage is deflected onto the belt. Similarly the feeder is provided with a fine mesh screen bottom to allow feed crumbs to filter out and be directed onto the conveyor belt.

Many other objects and purposes of the invention will be apparent from the following detailed description of the drawings.

DETAILED DESCRIPTION OF THE DRAWINGS

Figure 1:
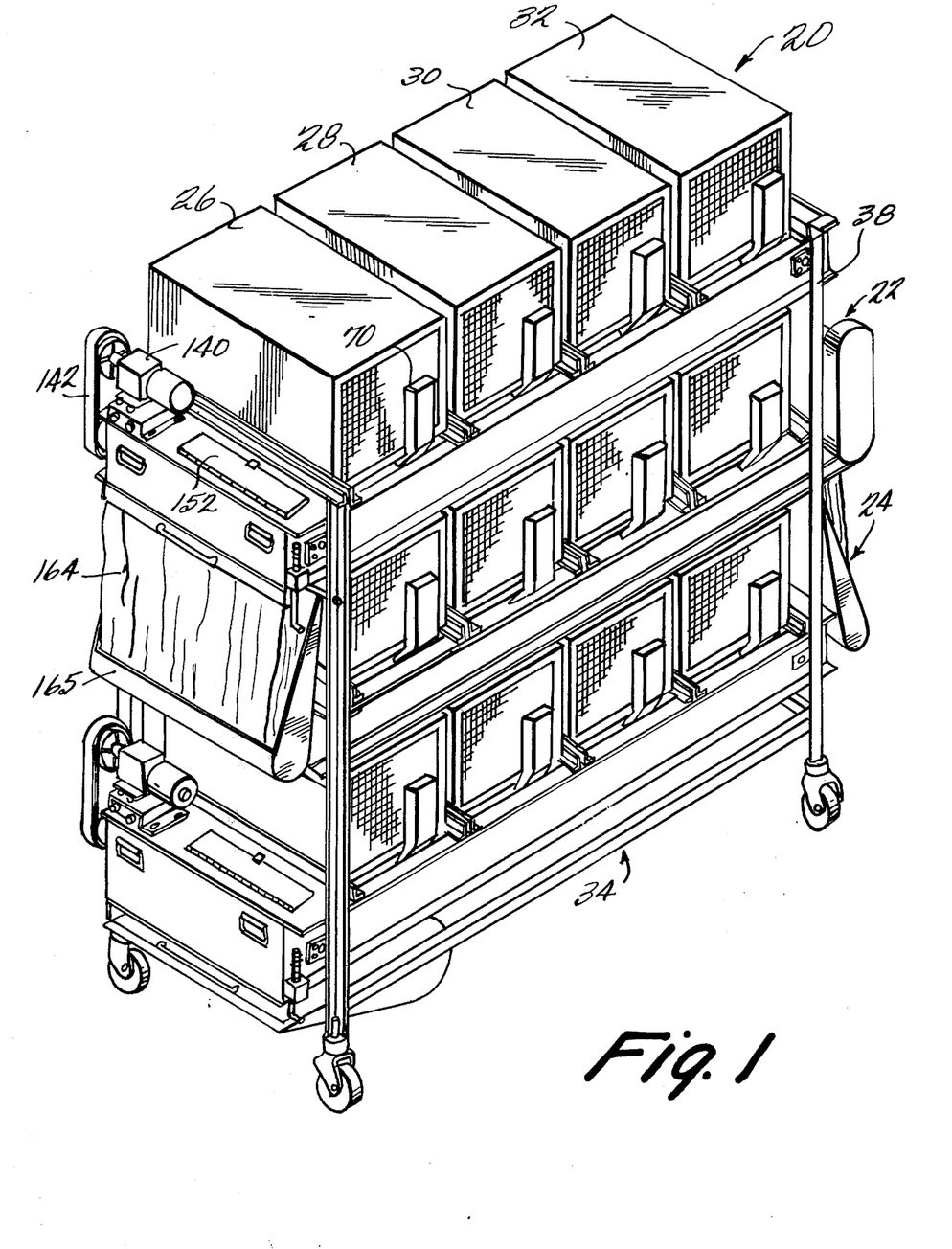
FIG. 1 shows a prespective view of an assembled cage system according to this system.

As discussed briefly above, the invention of this application finds particular utility where a large number of laboratory animals such as rats, mice, rabbits, monkeys, etc. are to be housed in a number of cages extending in rows, preferably one above the other, and mounted in a frame which may be wheeled from one location to another. As shown in FIG. 1, the system illustrated therein includes three vertical rows 20, 22, and 24 of cages each comprising four individual and identical cages. For example row 20 includes cages 26, 28, 30 and 32. Obviously, the shaped and size of the cages are determined in accordance with the requirments of each particular animal that is to be housed. Larger animals obviously require bigger cages.

Figure 2:
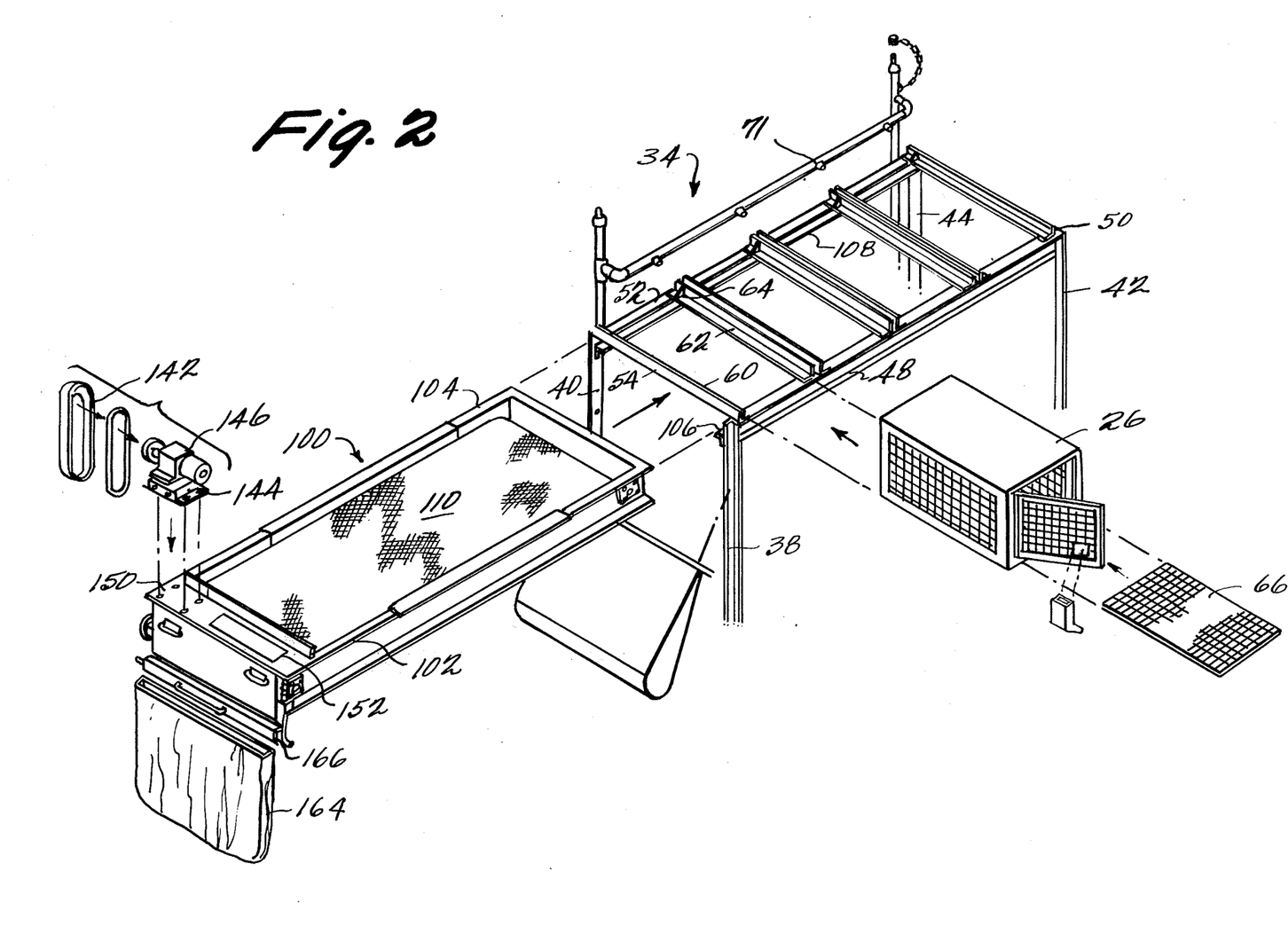
FIG. 2 shows an exploded view of the cage system of FIG. 1 with some of the elements removed for clarity and illustration.

Each of the individual cages, for example cages 26, 28, 30 and 32, is mounted on a cage frame 34 which is comprised of a number of metal frame members welded or otherwise fixed together into a generally rectangular configuration. Frame 34 includes four vertical members 38, 40, 42 and 44 which can be seen best in FIG. 2 and which are held together at the level of each row of cages by horizontal members 38, 50, 52 and 54. Extending between members 48 and 52 are a plurality of L-shaped members which serve as rails for supporting the individual cages, for examples cages 26, 28, 30 and 32. The cages can be easily and simply removed by sliding movement along the direction of the arrows indicated in FIG. 2. For example cage 26 in FIG. 2 is mounted for sliding movement between L-shaped members 60 and 62. Stops such as stop 64 are preferably provided for locating the individual cages at the desired position on the rails.

Figure 5:
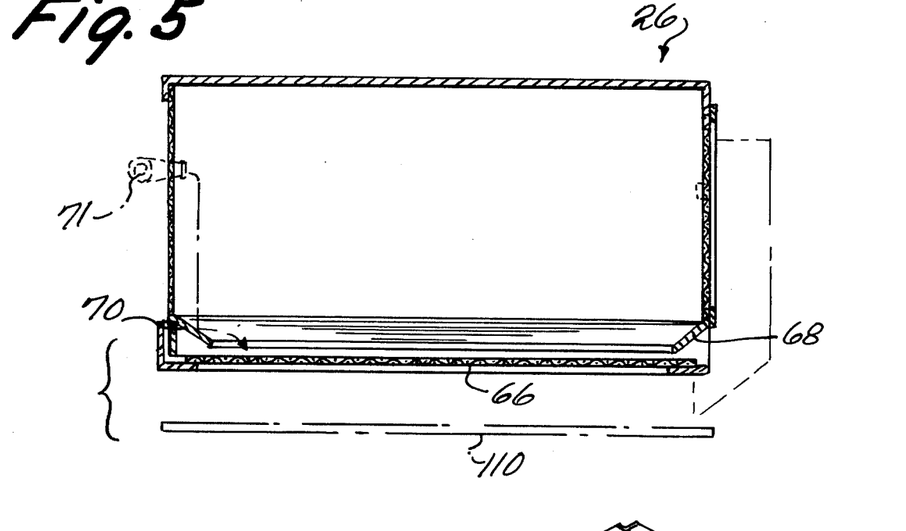
FIG. 5 shows a sectional view of one of the cages.

As mentioned briefly, above, each of the cages is provided with four deflector plates extending just above the stainless steel, as appropriate removable cage floor 66 having passages therethrough and inclined inward therefrom to deflect all waste originating in the cage onto belt 110. Alternatively, the deflectors could be arranged below the floor. Referring to FIG. 5, deflector plates 68 and 70 can be seen. A conventional watering system 71 extends into each cage.

Figures 3, 4:
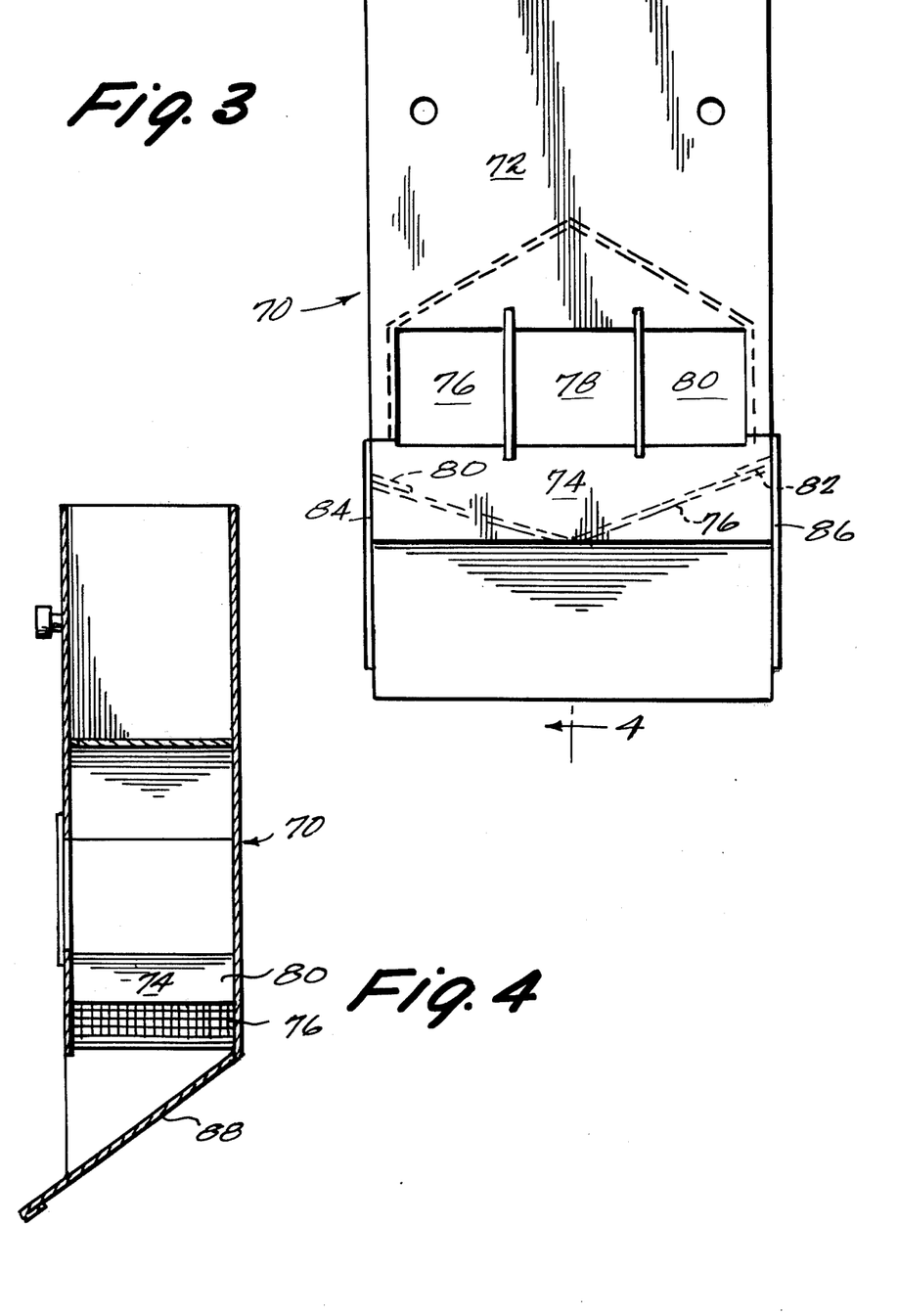
FIG. 3 shows a front view of a feeder for use in the system of FIGS. 1 and 2.
FIG. 4 shows a view of the feeder of FIG. 3 along the lines 4—4.
Figure 7:
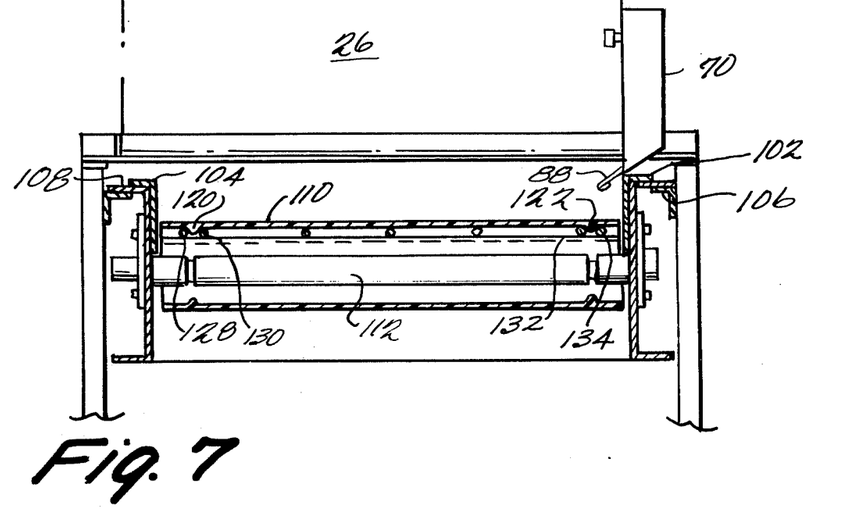
FIG. 7 shows a sectional view of the waste removing system along the lines 7-7 in FIG. 6.

In addition, each of the feeders is provided with structure for ensuring that fine crumbs will fall directly through the feeder and be deflected onto moving belt 110. Referring to FIGS. 3 and 4, feeder 70 is formed of sheet metal or the like so as to provide a chute generally indicated as 72 through which material disposited at the top of feeder 70 falls into a trough 74 which is accessable through openings 76, 78 and 80 from the inside of the cage. The animal inserts its head through the respective openings to eat the food in trough 74. Trough 74 is comprised of a fine mesh screen 76 which is attached by members 80 and 82 to the exterior walls 84 and 86 respectively of feeder 70. Fine crumbs fall through the fine mesh screen 76 and are deflected by inclined plate 88, as can be seen in FIG. 7, directly onto belt 110.

As discussed briefly above, each of the unique animal waste removing systems of this invention can be simply and easily inserted and removed from cage frame 38. One such system as can be seen in FIG. 1 extends below each row. As can be best seen in FIGS. 2 and 4, waste disposal frame 100 includes a pair of flanges 102 and 104 extending along opposite sides thereof for engaging for sliding movement therealong rails 106 and 108 which extend below the rows of cages between respective members 40 and 44 and members 38 and 42.

Figure 8:
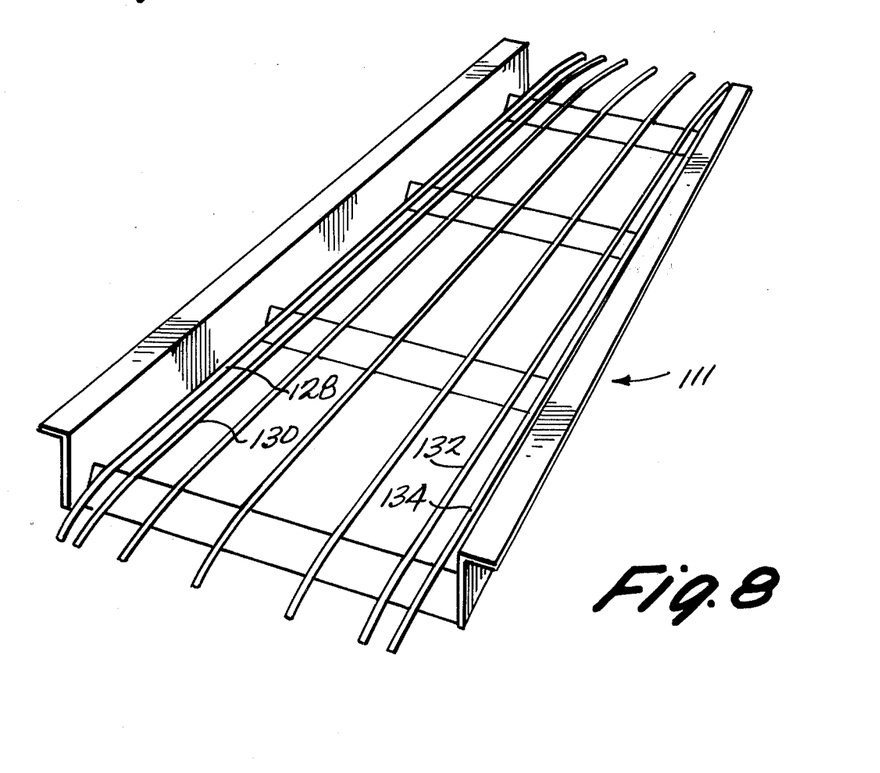
FIG. 8 shows a prespective view of the belt support of the waste conveying system.

A continuous belt 110 is mounted within frame 100 for movement about a pair of rollers 112 and 114. Belt 110 is preferably made of silicone impregnated fiberglass fabric. Belt 110 further is provided with two rows of pins 120 and 122 which extend along the direction of movement and which ensure that belt 110 will track properly with respect to rollers 112 and 114. Alternatively, ribs or any other tracking arrangement can be used. Belt 110 moves over a removable supporting frameword 111 mounting a number of rods, as shown in FIG. 8, extending along the direction of belt movement. As can be best seen in FIG. 2, pins 120 and 122 ride respectively between rods 128 and 130 and rods 132 and 134. Rollers 112 and 114 are similarly provided with grooves for engaging rows of pins 120 and 122 to ensure correct tracking.

When a solid sheet bed was utilized for supporting the belt, problems were encountered when the structure was cleaned by automatic washing equipment. Suction caused by water trapped between the belt and the solid bed caused the belt to stick thereto preventing operation until drying. Utilizing a plurality of rods as illustrated in FIG. 8 eliminated this problem.

Figures 6, 9, 10:
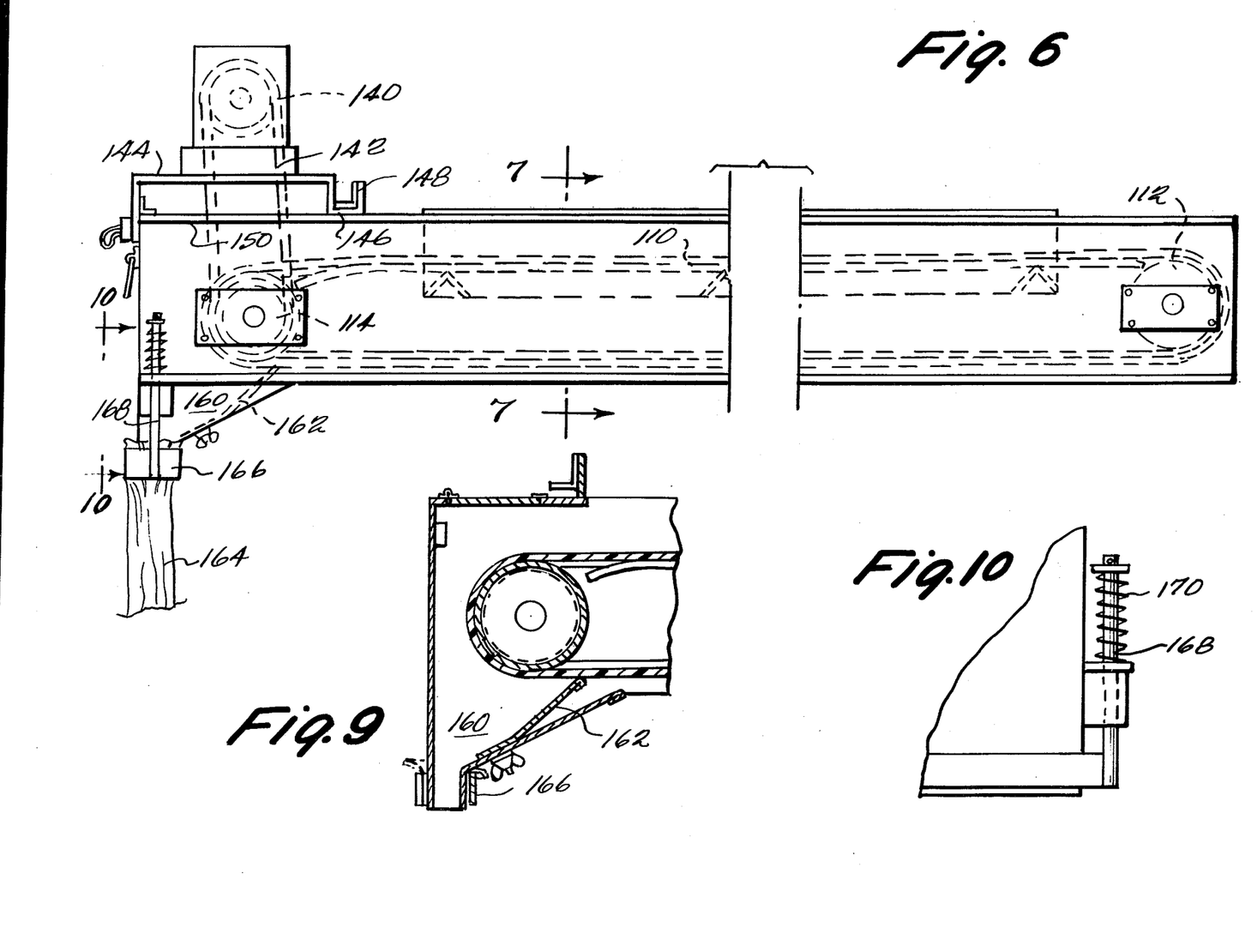
FIG. 6 shows a side view of the waste removing system.
FIG. 9 shows a partial sectional view illustrating the chute and scraper.
FIG. 10 shows a partial side view illustrating the spring loading mechanism for the rectangular member which holds the flexible bag in position over the gutter outlet.

Belt 110 is driven by an electrical motor 140 of conventional construction through a belt 142 which rotates roller 144 as can be seen for example in FIG. 6. It is contemplated that operation will be continuous, for example at one belt revolution in approximately 3 ½ minutes. Motor 140 is mounted on a substantially horizontal plate 144 which has at one edge thereof an L-shaped flange 146 which slides under a further L-shaped flange 148 mounted on the horizontal plate 150 which extends as can be seen in FIG. 2. Motor 140 together with plate 144 can be simply removed by sliding the two flanges apart to permit the rest of the conveying system to be inserted without further disassembly into a suitable washing or sterilizing machine if desired the motor can be removably mounted directly on the end of roller 144. A door 152 is provided in horizontal plate 150 to be opened during washing or sterilization to ensure that all of the interior parts of the conveyor below plate 150 will be suitably sterilized.

The belt tends to become electrically charged during operation and thus attracts animal hair which might otherwise contaminate equipment or the laboratory area. The hair collects on scraper 162 and can be removed when convenient.

The waste material from the cages thus falls on the conveyor which is preferably operated continuously, although it may be operated intermittently, and moves along the length of the row of cages toward one end thereof where a chute 160 is provided for catching the waste material from the outer surface of belt 110 as it turns under. A teflon coated scraper 162 is further mounted adjacent chute 160 for engaging the outer surface of belt 110 after it has turned under about roller 114 to ensure that all of the waste material is deflected into the chute 160.

A flexible bag 164, for example, plastic which is disposable, is attached removably to the outlet throat of chute 160 for receiving the waste material. When a suitable quantity of waste material has accumulated, bag 164 is then removed and disposed of. A metal holder 165 supports the bag.

Rectangular member 166 holds the bag in position. Attached to either side of rectangular member 166 as can be best seen in FIG. 10 is an upwardly extending rod 168 which extends through a bore in the frame 100. Spring 170 urges rod 168 and rectangular member 166 continuely upward with member 166 normally engaging the outlet opening of chute 160.

To remove a bag or to add a new bag, member 166 is simply pulled downward against the force of spring 170 until it is clear of the downwardly extending throat or snout of chute 160. The bag can then be simply pulled through rectangular member 166 or a new bag pulled upwardly through the member, and slightly thereabove.

When rectangular member 166 is returned by spring 170 to its illustrated position in FIG. 5, the bag is held between the downwardly extending snout or throat portion of gutter 160 and rectangular member 166.

Figure 11:
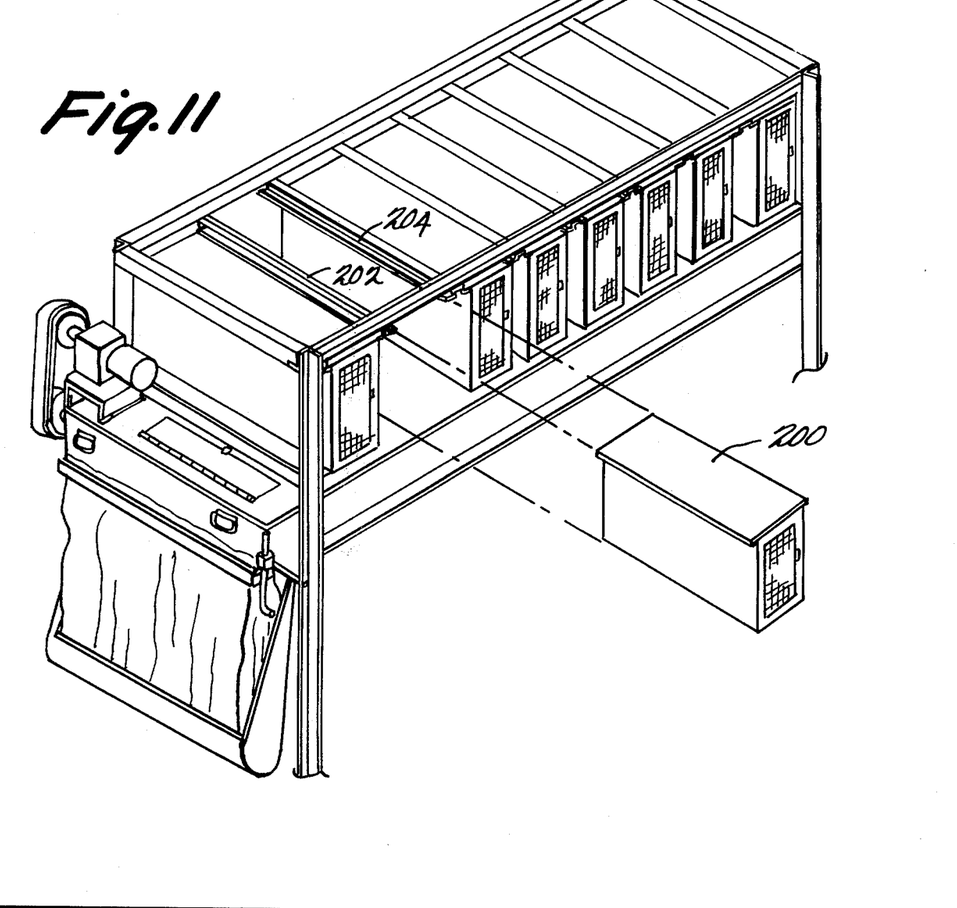
FIG. 11 shows a prespective view of a further embodiment in which the cages are hung from rails rather than being supported thereon as in the arrangement in FIGS. 1-10.

FIG. 11 shows an alternative form of the invention in which the cages such as cage 200 are suspended from the rails 202 and 204. Such suspension is usual for the rodent cages.

Many changes and modifications in the above described embodiment of the invention can, of course, be carried out without departing from the scope thereof. Accordingly, that scope is intended to be limited only by the scope of the appended claims.

What is claimed is:

1. An automatic waste disposal system for caged animals comprising:
    a supporting frame including a pair of rails,
    a continuous belt,
    means for mounting said belt for endless movement beneath a plurality of animal cages to receive waste from animals in said cages on the outer surface thereof, said mounting means engaging said rails and being slidable along said rails for removal thereof,
    means on said mounting means for driving said belt to cause movement of said belt beneath said cages,
    scraper means on said mounting means for contacting said outer surface of said belt and remove waste thereon, and
    means on said mounting means adjacent said scraper for holding a flexible bag with an open end positioned for receiving waste from said belt.

2. A system as in claim 1 wherein said holding means includes a rectangular member having a central bore, the open end of said bag extending through said bore, a chute adjacent said rectangular member having a throat extending about a chute outlet which receives said waste, said rectangular member fitting over said throat to hold a flexible bag therebetween, a rod member attached to and extending upward from said rectangular means and spring means urging said rod member and rectangular member upwards to a position with said rectangular member about said throat and said bag held therebetween.

3. A system as in claim 1 wherein said belt is silicone impregnated fiberglass fabric.

4. A system as in claim 1 wherein said bag is plastic and including said bag as a part of the system.

5. A system as in claim 1 wherein said mounting means includes a frame, a pair of rollers mounted for rotation about an axis roughly perpendicular to the direction of movement of said belt and a plurality of rods attached to said frame to define a belt support extending along the direction of movement of said belt between said rollers for supporting said belt during movement.

6. A system as in claim 5 wherein said belt has a row of pins along each edge on the under surface thereof extending along the direction of movement of said belt and each row guided between adjacent rods to guide movement of said belts and wherein each said roller has a pair of grooves for receiving said belt tracking pins.

7. A system as in claim 5 wherein said mounting means includes a pair of rollers engaging said belt, and means for mounting said rollers for rotation about an axis perpendicular to the direction of movement of said belt, and said driving means includes a motor.

8. A system as in claim 7 wherein said mounting means includes a plate over one of said rollers which defines a hinged opening for opening during washing and sterilization.

9. An animal caging system comprising:
    a cage supporting frame having at least a pair of rails,
    a plurality of animal cages supported on said frame in at least one row, and
    means for disposing of animal waste including:
    a continuous belt,
    means for mounting said belt for endless movement beneath said row of animal cages to receive waste on the outer surface thereof from animals in said cages, said mounting means engaging said rail and being slidably mounted for movement along said rails,
    means on said mounting means for driving said belt,
    scraper means on said mounting means for contacting said outer surface of said belt to remove waste thereon, and
    means on said mounting means adjacent said scraper for holding a flexible bag with an open end positioned for receiving waste from said belt.

10. A system as in claim 9 wherein each such cage includes an animal feeder, each such feeder including a trough for containing food accessible from within said cage, a fine mesh bottom in said trough for permitting food crumbs to fall therethrough and an inclined plate below said mesh bottom for guiding said crumbs onto said belt.

11. A caging system as in claim 9 wherein each said cage includes inwardly inclined plates extending about the bottom of said cage to deflect waste onto said belt.

12. A caging system as in claim 9 wherein said frame includes a plurality of pairs of separated rails for each receiving and supporting a cage, said cage being slidable along the rails in a direction transverse to the direction of movement of said belt.

13. A caging system as in claim 9 including means for supplying water to each of said cages.

14. A caging system as in claim 9 including a plurality of rows of cages, one above the other, and a plurality of disposing means each mounted below one of said rows.

15. A system as in claim 9 wherein said mounting means includes a pair of rollers engaging said belt, and means for mounting said rollers for rotation about an axis perpendicular to the direction of movement of said belt, and said driving means includes a motor.

16. A system as in claim 9 wherein said mounting means includes a pair of rollers mounted for rotation about an axis roughly perpendicular to the direction of movement of said belt and a plurality of rods attached to said frame to define a belt support extending along the direction of movement of said belt between said rollers for supporting said belt during movement.

17. A system as in claim 16 wherein said belt has a pair of separated rows of pins on the under surface thereof extending along the direction of movement of said belt along each edge and each guided between adjacent rods to guide movement of said belt and wherein each said roller has a pair of grooves for receiving said row of pins.

18. A system as in claim 9 wherein said holding means includes a rectangular member having a central bore, the open end of said bag extending through said bore, a chute adjacent said rectangular member having a throat extending about an outlet said rectangular member fitting over said throat to hold a flexible bag therebetween, a rod member attached to and extending upward from said rectangular member and spring means urging said rod member and rectangular member upwards to a position with said rectangular member about said throat.

19. A caging system comprising:
a cage supporting frame for supporting a plurality of animal cages in at least one row and having a pair of separated rails extending below said cages,
a plurality of said cages each having a bottom for permitting waste to drop therethrough,
conveying means disposed below said row including a continuous belt mounted for removing said waste,
means engaging said conveyor means for depositing said waste into a container,
means for mounting said conveying means flange members engaging said pair of rails for sliding movement therealong so as to permit removal of said conveying means and engaging means for washing and/or sterilization.

20. A caging system as in claim 19 wherein each said cage includes an inwardly inclined deflector plate extending about the bottom of said cage to deflect waste onto said belt.

21. A caging system as in claim 19 wherein said frame includes a plurality of pairs of separated rails for each receiving and supporting a cage, said cage being slidable along the rails in a direction transverse to the direction of movement of said belt.

22. A caging system as in claim 19 including means for supplying water to each of said cages.

23. A caging system as in claim 19 including a plurality of rows of cages, one above the other, and a plurality of disposing means each mounted below one of said rows.

* * * * *